Dec. 1, 1970     J. W. TURNER ET AL     3,544,997

COUNTERMEASURE RADAR CHAFF

Filed Feb. 6, 1967

INVENTORS
James W. Turner &
Charles J. Holly, Jr.

BY *John Cyril Malloy*
ATTORNEY

United States Patent Office 3,544,997
Patented Dec. 1, 1970

3,544,997
COUNTERMEASURE RADAR CHAFF
James W. Turner, Pompano Beach, Fla. (31309 Tuttle Drive, Bay Village, Ohio 44140), and Charles J. Holly, Jr., 469 SE. 17th Terrace, Deerfield Beach, Fla. 33441
Filed Feb. 6, 1967, Ser. No. 614,344
Int. Cl. H01q 15/14
U.S. Cl. 343—18         6 Claims

ABSTRACT OF THE DISCLOSURE

Radar chaff is formed of a number of metal-coated glass fibers and a number of uncoated glass fibers, all enrobed and united in parallel coextensive relation, into a single unitary strand, by binder material such as a thermoplastic resin. The ratio of uncoated fibers to coated fibers may vary in proportion to the effective dipole length of the chaff.

---

This invention relates to radar reflectors, commonly known as "chaff," "rope" or "window," dispensed from aircraft to confuse enemy radar and to misdirect antiaircraft fire controlled thereby. Reference is made to U.S. Pats. Nos. 2,881,425 and 3,221,875, for definitions of the terms "chaff," etc., and the general distinctions between them. In the following disclosure the term "chaff" will be used in a comprehensive and generic sense to include as well, "rope" and "window."

The effectiveness of chaff against enemy radar depends upon a number of factors. While heavier metals such as zinc, tin, lead, bismuth, and some alloys of these metals, as well as copper and nickel, are theoretically possible of use as chaff or dipoles, in actual practice aluminum has been the metal chiefly employed because of its low specific weight and its resulting capacity of relatively slow descent through the air. Another factor is the effective length of the chaff with respect to the frequency of enemy radar. Since individual lengths or strips of chaff act as dipoles which reflect or re-radiate the radar waves incident thereon, greatest effectiveness requires a length of strand closely equal to one-half the wave length of the hostile radar to be combatted.

Furthermore it is necessary that the individual lengths or strands of chaff be sufficiently stiff to resist bending without breaking, and resilient to assume or to re-assume linear form. Otherwise, that is, if the individual lengths of chaff are easily distorted out of linear form, as by currents of air, or if they become easily entangled with one or more other strands on being launched or expelled from an aircraft, its effectiveness in re-radiating, reflecting and confusing enemy fire, can be greatly diminished. This factor, of course, increases in importance with the wave length of the radar to be combatted and misdirected.

Secondarily, the problem of packaging chaff compactly, and the readiness with which it may be dispensed and separated into discrete free-floating lengths, is also important. Great quantities of chaff are required for any one protective or screening operation, so that it is important not only to package the material in compact form, but also that the packaged chaff be relatively easy to dispense with assurance that it will disperse when ejected into the air.

Since chaff may be required which varies in length from a fraction of an inch to several feet or more, it is clear that dipoles of, say, two inches or more in length may be required to have greater strength and resiliency than those of shorter lengths. Hence a dipole material which may be eminently satisfactory for use in shorter lengths, may be unsatisfactory in use if made up in greater lengths.

Although the problems and requirements involved in the effective use of chaff are well known, these problems have not heretofore been completely and satisfactorily solved. Accordingly it is the chief object of this invention to provide radar chaff which satisfies to a high degree, all primary and secondary requirements as previously outlined.

Another object is to provide chaff which, while sufficiently yielding and flexible to be wound in the form of compact rolls, is at the same time strong and resilient so that the individual strands resume linear or substantially linear form after ejection into the air, particularly in the longer lengths sometimes required.

Yet another object is to provide radar chaff which because of the strength and resiliency of individual strands thereof, is not broken or permanently deformed by the shock created when ejected from aircraft moving at high speed.

Still another object is to provide chaff which significantly conserves metal per unit mass, and so is of particular importance in time of war, when metals such as aluminum become strategic and must be conserved to the maximum extent possible.

Another object is to provide radar chaff which because of the relatively low mass of metal per unit mass of chaff, enables the satisfactory use of heavier metals, in particular those less expensive and less strategic than aluminum.

A further object is to provide chaff which while fully effective for its intended purpose in deception and misdirection of enemy radar and antiaircraft fire and fighter planes directed thereby, may be made at costs significantly lower than prior art products of equal effectiveness.

Still another object is to provide a method and apparatus for production which enables the fabrication of chaff whose strength and resiliency are definitely and purposefully correlated with each required length of dipole, without material alteration in production apparatus, without substantial change in mass per unit length, in cross sectional area of the individual strands, or in the method of packaging and/or dispensing.

Other objects and advantages of the invention will become clear to those skilled in the art, after a study of the following description, in connection with the accompanying drawing.

The use of either foil or metal coated glass fiber as radar reflectors for low frequency ranges involving dipoles longer than two inches has always presented serious problems. Dipoles longer than two inches have a tendency to bend, fold or coil during free fall, thus decreasing the effective radar reflection. This is particularly true of dipoles longer than four inches. In effect, the longer the dipole, the more the tendency to bend, fold or coil.

To decrease these effects in longer dipole lengths it has been proposed to use heavier and thicker foil and larger diameter glass fibers. Although these changes help somewhat, they are by no means a complete and satisfactory solution of the problems inherently involved. To date, it has not been possible to use foil which is of gauge sufficiently heavy to impart the desired rigidity while retaining the required lightness in weight. The glass fibers of larger diameter inevitably result in dipoles which are more sensitive to fracture.

We have solved the problems by providing a multi-strand, stiff yet resilient dipole consisting of several metal coated glass fibers and several glass fibers which are devoid of metal coating, all held together by a binder. The metal coated fibers afford the required radar reflection while the uncoated ones impart both strength and resiliency. A large number of combinations are possible between the relative numbers of bare glass and coated fibers, as well as the absolute total number. We have made experiments of strands containing from 2 to 20 metal coated fibers in a total of 20 fibers, as well as combinations in strands with less than, as well as more than a total of 20 fibers. There is reason to believe that one coated fiber in a strand totalling 20 or more fibers would give satisfactory radar reflection. Conversely, any number of coated or uncoated fibers could be combined into one strand, in proportion to the stiffness desired and the limitations as to size or diameter of strand. The stiffness and resiliency can be adjusted by the addition or subtraction of bare glass fibers. The diameters of these strands will, of course, vary with the number of fibers used and the diameter of the individual fibers. In our experiments we have used bare glass fibers of approximately 0.0005" diameter and coated glass fibers of between 0.00075" and 0.001" diameter. The resulting strands of 20 fibers each have ranged from 2 to 4 mils in diameter, depending upon the ratio of bare to coated glass fibers embodied in the strand. As shape determines stiffness to a large extent, strands which are essentially round in cross section are preferable but not absolutely necessary. Other regular geometrical cross sectional shapes are contemplated, as determined by forming the strand through a V-slot in a graphite bar before hardening the binder material.

In addition to factors set forth in the preceding paragraphs, the selection and use of a binder with stiffness and resilient properties adds to the performance and effectiveness of the multifiber strand. We have found that vinyl ether is very satisfactory as a binder. Other materials using polyacrylics, polystyrene, polyvinyl alcohols, polyvinyl chlorides, waxes, polyethylenes, epoxies and polyvinyl acetate have also been used. Other binders each having desired properties for specific use, are possible.

The resulting multifiber strand using the process or method indicated, is extremely resilient, returning to its original configuration even after the fibers have been broken by excessively sharp bends. In addition to resiliency, the novel strand because of the several small diameter fibers, is flexible and not easily broken.

Figure 1:
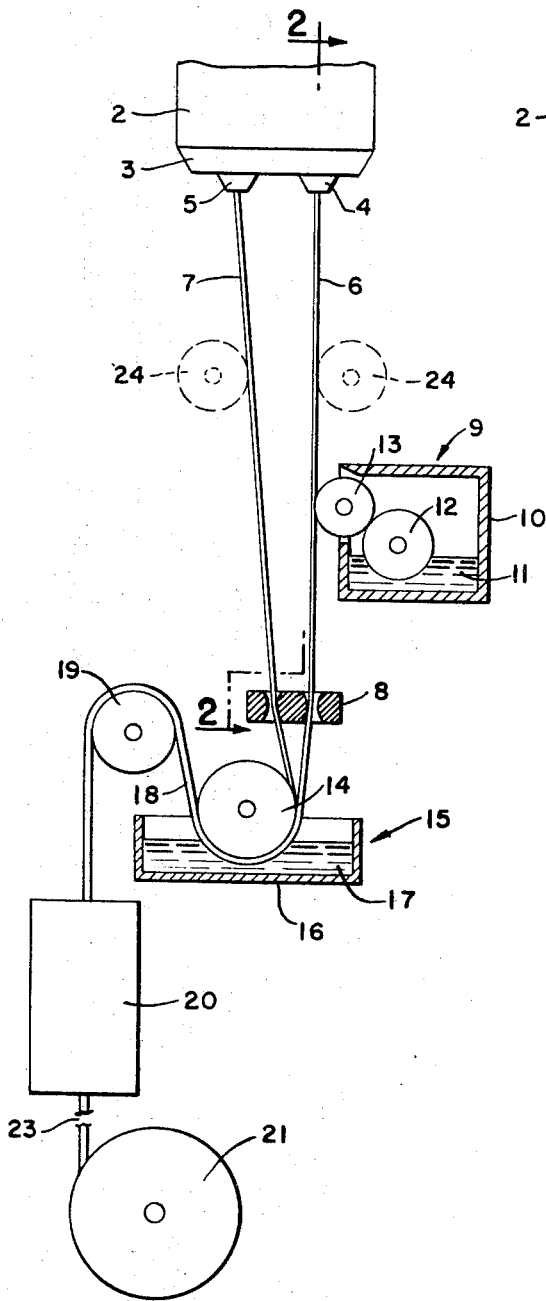
FIG. 1 is a schematic view of an apparatus by which the strands may be formed.
Figure 2:
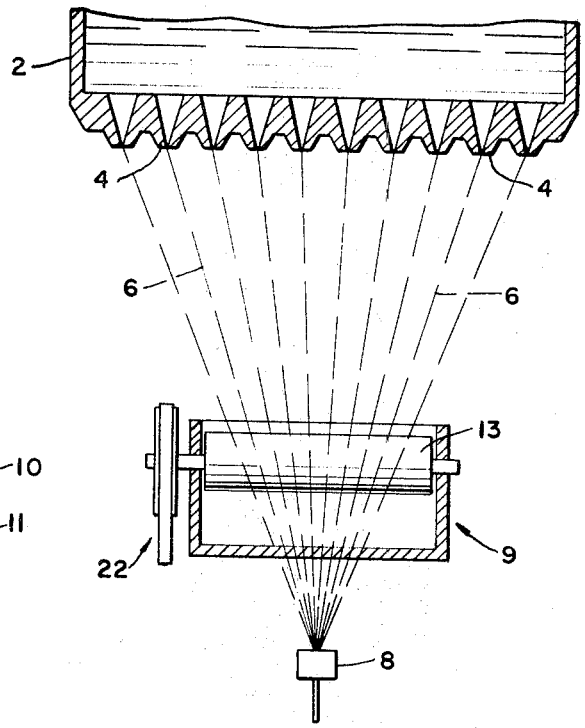
FIG. 2 is a detail sectional view taken in planes about as identified by broken lines 2—2, FIG. 1.
Figure 3:
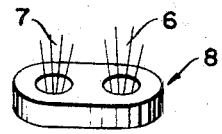
FIG. 3 is a detail perspective view of a gathering block for bringing the coated and uncoated fibers together.

Referring in detail to the drawing, glass fibers are drawn from the forehearth of a melting tank 2, through feeder 3 having two rows 4 and 5 of orifice tips which form, respectively, two sets of individual filaments 6 and 7 as they are drawn downwardly. Filaments or fibers 7 which may be ten in number, pass directly to and through a respective one of two orifices in gathering device 8. Filaments 6, on the other hand, pass downwardly to metal coating device generally identified at 9, which may consist of a tank 10 of refractory material within which a bath of metal 11 is maintained molten by heating means not shown. Applicator rolls 12 and 13 of which at least roll 13 may be driven by means generally indicated at 22, at a slower peripheral speed than the linear speed of the filaments.

As filaments or fibers 6 pass into contact with roll 13, which may be graphite-coated, each receives a coating of metal such as aluminum. The metal coated fibers pass downwardly to and through an aperture in gathering device 8. If desired, cooling means may be interposed between roll 13 and device 8 to assure that the metal coatings are solidified as the fibers 6 arrive at device 8. Although for clarity of illustration the two sets of bare and metal-coated fibers are shown separated as they pass through gathering means 8, in actual practice the two apertures therein are closely spaced so that the two sets of fibers are all but combined into a single strand as they pass to a roller 14 of an adhesive or binder applicator generally identified at 15, and comprising a tank 16 containing a bath 17 of binder such as vinyl ether. After passing about roller 14 the two sets of fibers, now combined and united into a single strand 18, pass about roller 19, to and through drier 20, thence to a power-driven gathering spool or roll 21 equipped with the usual traversing device, not shown.

It is contemplated that strand 18 may be given two coatings in succession of the same binder, with a drying stage after each coating, a fact indicated by the break therein at 23. Since the second coating apparatus and drier therefor may be duplicates of items 15 and 20, respectively, it is deemed unnecessary to show them in detail. It is contemplated that where two coatings are applied they may be of the same or different binders, wherein the first is, for example, more fluid and thus penetrates more readily into and among the fibers, while the second may be more viscous or easily dried, to assure full coverage of the outer fibers at and adjacent the periphery of the strand.

Figure 4:
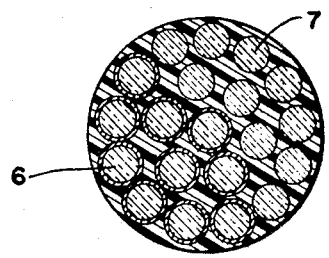
FIG. 4 is a cross section to a greatly enlarged scale, of one embodiment of the novel strand.

The resulting strand, in the particular embodiment shown in cross section upon FIG. 4, is generally circular and consists of ten fibers, bare and metal coated each, all firmly united into a single strand by the thermoplastic vinyl or like material.

Of course, the number of fibers bare and metal coated may be varied in accordance with the dipole length into which the strands are to be cut or severed. Likewise, the ratio of metal coated to bare fibers may be varied.

It is contemplated that the aforesaid ratio may be varied by a roller or rollers generally indicated at 24, FIG. 1, and which may be horizontally adjusted to (a) hold a selected number of filaments of group 6 out of contact with roll 13, or (b) to divert a selected number of filaments or fibers of group 7 out of their straight downward path shown, into contact with roll 13. Thus, not only may the number of fibers in a strand be varied by obturating or adding tips 4, 5, but also the ratio of metal coated to uncoated fibers may be varied, from one metal coated fiber to a selected plurality thereof.

The embodiment of apparatus shown for producing the novel strand is to be taken in an illustrative, rather than in a limiting sense.

For example, it is possible to form still larger strands by combining more than 20 fibers into a strand. There may be, for example, 40 filaments of which 20 are coated. Such a strand will be about 6 mils in diameter and may have utility in certain low frequency applications. Up to certain physical limitations as to diameter and size, any combination of coated and uncoated fibers in the composite strand is possible and useful. Merely as an estimated upper limit, we would say that strands may be made in diameters up to 8 mils. Such a strand would contain approximately 100 filaments.

Thus, those skilled in the art will recognize that many variations of the precise form and nature of the strand and the apparatus for its production are possible. In addition to changes in the number of filaments, coated and uncoated, the metal coating may be applied by spraying or other known procedure. Thus the invention is independent of any particular mode or manner of production; and the claims are to be interpreted without regard to the manner in which the fibers or filaments are drawn, some of them coated with metal, and all united into an adhesive group or strand.

Having fully disclosed the invention, what we claim and desire to secure by Letters Patent is:

1. In radar chaff, a strand comprising a plurality of glass fibers of equal length, at least one of said fibers being metal coated for providing a dipole radar reflection, the remaining ones of said fibers being devoid of metal coating and comprising stiffening elements in said strand, and binder material securing all said fibers together in parallel, side-by-side coextensive relation, into a unitary stiff but resilient strand, and maintaining said strand in a substantially discrete, linear configuration when discharged into the atmosphere and substantially preventing entanglement with other strands.

2. The strand of claim 1, said binder material being an adhesive permeating the interstices between said fibers and essentially enrobing all of them, to unite said fibers as aforesaid.

3. The strand of claim 2, said binder material being selected from the group consisting of vinyl ether, polyacrylics, polystyrenes, polyvinyl alcohols, polyvinyl chlorides, polyethylenes, waxes, epoxies, and vinyl acetate.

4. The strand of claim 1, said fibers having a diameter of about 0.0005", said metal coating having a thickness about 0.000125" to 0.00025".

5. The strand of claim 1, said metal coating being aluminum and alloys thereof.

6. The strand of claim 3, said fibers totaling about 20, substantially equally divided between metal coated and those devoid of metal coating, said strand being essentially circular in cross section and having an over-all diameter of from 2 to 4 mils.

References Cited

UNITED STATES PATENTS

| | | | |
|---|---|---|---|
| 2,426,413 | 8/1947 | Pollett | 343—18 |
| 3,221,875 | 12/1965 | Paquette | 343—18 |

FOREIGN PATENTS

| | | | |
|---|---|---|---|
| 834,596 | 5/1960 | England | 343—18 |

RODNEY D. BENNETT, JR., Primary Examiner

B. L. RIBANDO, Assistant Examiner